Feb. 3, 1959  O. H. SCHUCK  2,872,272
AUTOMATIC RELATIVE POSITION PLOTTER
Original Filed Sept. 21, 1944

INVENTOR
OSCAR HUGO SCHUCK
BY
ATTORNEY

Feb. 3, 1959      O. H. SCHUCK      2,872,272
AUTOMATIC RELATIVE POSITION PLOTTER
Original Filed Sept. 21, 1944      2 Sheets-Sheet 2
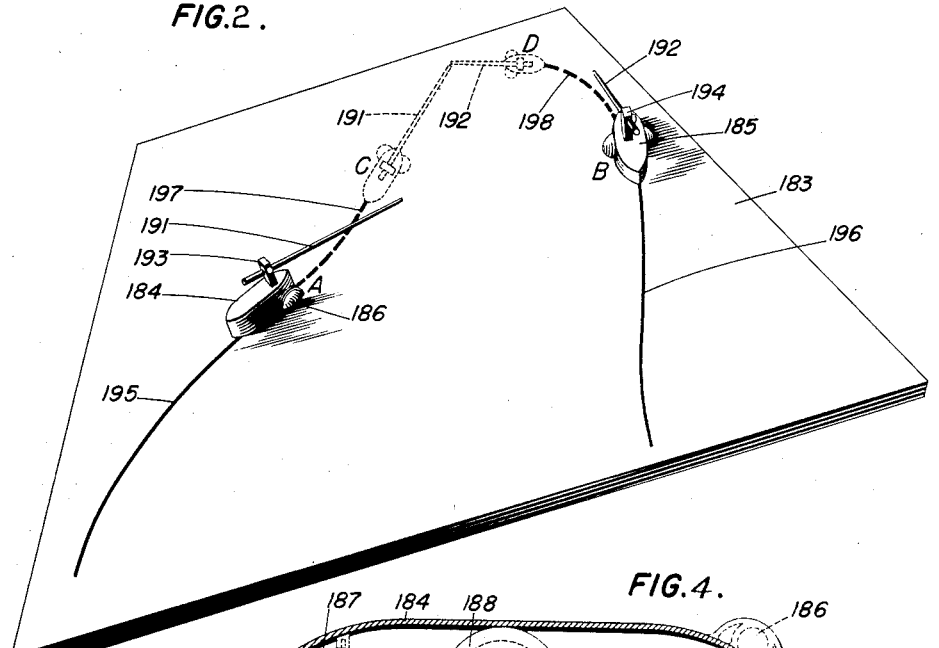
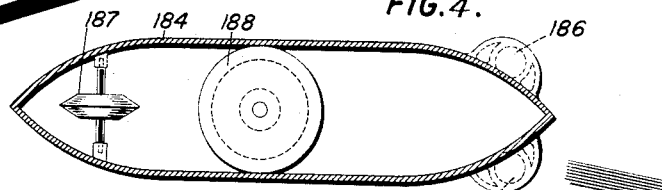
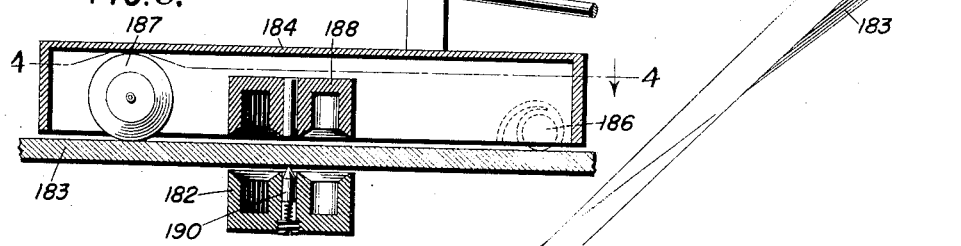
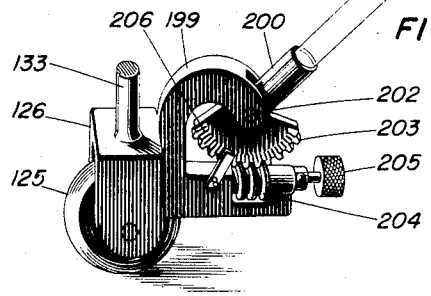
INVENTOR
OSCAR HUGO SCHUCK
BY
ATTORNEY

United States Patent Office 2,872,272
Patented Feb. 3, 1959

2,872,272

AUTOMATIC RELATIVE POSITION PLOTTER

Oscar Hugo Schuck, Belmont, Mass., assignor to the United States of America as represented by the Secretary of the Navy Original application September 21, 1944, Serial No. 555,152. Divided and this application May 1, 1957, Serial No. 661,987

3 Claims. (Cl. 346—8)

This invention relates in general to position plotters and in particular to a new and improved apparatus for plotting the course of a moving target relative to a particular station and also to plot the course of the latter if it is also in motion.

This application is a division of copending U. S. patent application Serial No. 555,152, filed September 21, 1944, by the present applicant, which has become abandoned.

The principal object of the invention is to provide an improved plotting device whereby the commander of a war vessel may have before him a continuous indication of the position of his vessel relative to that of an enemy vessel which will show the relative position and heading of the two vessels at every instant.

Another specific object is to provide a new and improved course plotter which includes a fixed and translucent table; a first stylus which moves over the underside of the table to chart thereon the course of the attacking vessel; and a second stylus carried by the support structure for the first stylus, and movable relative thereto in the same manner as the target moves relative to the attacking vessel which charts the course of the target.

These and other objects of the invention will become more apparent from the detailed description to follow and from the drawings in which:

Fig. 2 is an alternative arrangement for the vessel position indicating means shown in Fig. 1;

Fig. 3 is an enlarged vertical section of one of the carriages shown in Fig. 2;

Fig. 4 is a plan view of one of the carriages taken on lines 4—4 of Fig. 3; and

Fig. 5 is a still further alternative arrangement for the vessel position indicating means shown in Fig. 1.

Figure 1:
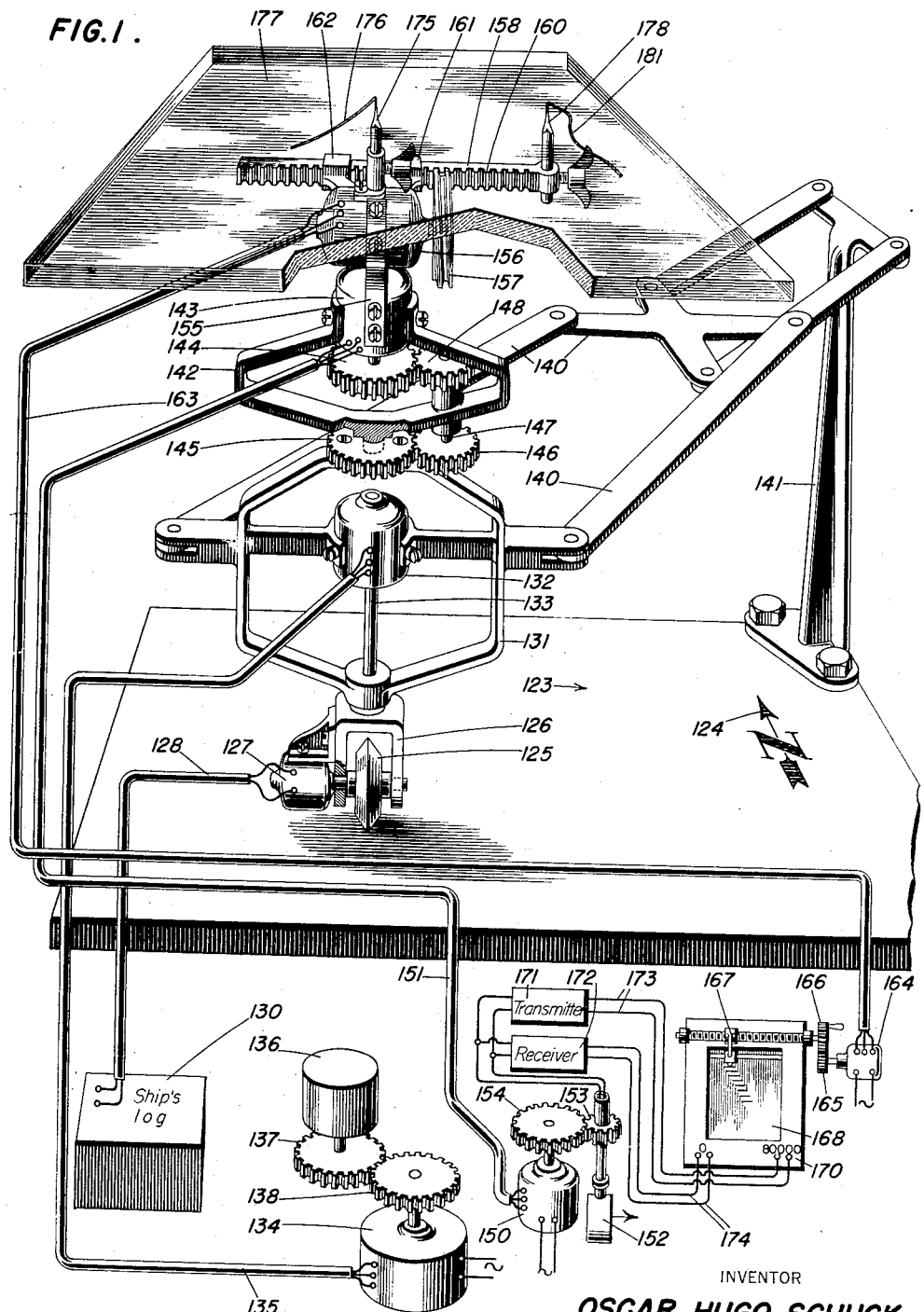
Fig. 1 is a combined perspective and schematic view of the invention wherein the instant position of both the pursuit vessel and target vessel are plotted relative to each other.

Referring now to the drawings in which like parts in the several views are indicated by like reference numerals and with particular reference to Fig. 1, there is shown a preferred embodiment of the invention as applied for indicating the instant position of an attacking vessel relative to that of an underwater target such as an enemy submarine.

In this arrangement, the apparatus for determining the instant bearing and range of the underwater target relative to that of the attacking vessel is conventional echo ranging equipment and has therefore been shown only in brief outline.

This echo ranging equipment comprises a sound transducer 152 which is located beneath the water line of the attacking vessel and is rotatable about a vertical axis either manually or automatically so as to keep it constantly trained toward a relatively moving target. This transducer which may be of either the piezo electric or magnetostrictive type of conventional design having a directional characteristic which makes it most sensitive along an axis normal to the active face of the transducer.

The directivity pattern of such a transducer has a major lobe which is rather narrow and thus when the elements of the transducer are actuated electrically through a conductor pair from a transmitter 171, the output of which is preferably in the supersonic range, pings of sound are projected periodically in substantially the form of a beam. The sound operator rotates the transducer 152 slowly around the underwater horizon stopping at bearing intervals of approximately 10° while pinging in order to listen for an echo of the ping as reflected by an underwater target. Any such echo will be picked up by the receiver 172 through conductor pair to give either or both aural and visual indication that a target vessel is located somewhere along the bearing at which the echo of the ping was returned. Once contact has been established the transducer may be trained automatically to follow the target, or manually if a deviation indicator of the type shown in copending application Serial No. 531,490, which matured into U. S. Patent 2,524,180 on October 3, 1950, is used.

For visually indicating the instant range of the underwater target, there is provided a range recorder 170 of conventional construction and therefore shown only in general outline.

Since the velocity of sound through water is substantially constant, being about 1600 yards per second, the range is readily determined from the time required by the energy pulse or ping to travel from the transducer 152 to the target and back again. Therefore, as each ping is emitted, a control pulse over conductor pair 173 causes a carriage 167 on slide rod therefor to move at a uniform rate across a chart member 168 from an extreme left position. The arrangement is such that when an echo is fed into receiver 172, the marking stylus, supported by carriage 16, receives a signal pulse over conductor pair 174 to mark a rather short horizontal line on chart 168. Carriage 167 is returned to its extreme left position and started out again at which time a new ping is initiated. The chart 168 of the range recorder is caused to move in the direction indicated by the arrow so that as each new ping is emitted, lines will be traced thereon in succession by the stylus. Thus the range chart shown in Fig. 1 obviously indicates a closing range between the attacking vessel and the underwater target.

In order to adapt the conventional range recorder just described to this invention, it may be provided with an auxiliary pointer at 167 carried by a lead screw which is rotatable manually by means of a combined handwheel and gear 166. Handwheel 166 is so manipulated that pointer member at 167 is maintained at all times at the instant range indicated on chart 168 or predicted by the operator. This may be done automatically, if desired, through apparatus shown in the copending application of Rodman et al., Serial No. 585,768, filed March 30, 1945, now U. S. Patent 2,709,796, issued May 31, 1955.

The present invention includes a table supported in a fixed position relative to the vessel on which the apparatus is carried. The arrow 124 marked "N" indicates north or 0° bearing on table 123, considered as a map.

A wheel 125, journaled in a yoke 126, is rotated by a motor 127 also supported by yoke 126. Motor 127 is supplied with current via conductor cable 128 from a ship's log 130 of conventional design and the arrangement is such that the travel of wheel 125 over table 123 is proportional to the distance traveled by the ship.

Yoke 126 is mounted for rotation on a vertical axis on a frame 131 within which is supported another motor device 132 coupled to yoke 126 by shaft 133. Motor device 132 is the repeater unit of a synchro direction transmitting system, the transmitter unit being indicated at 134 and connected to repeater unit 132 by cable 135. The position of the rotor element of transmitter 134 is determined by the position of the gyro compass 136 and the two are connected by meshed gears 137, 138. In operation, wheel 125 is set at the beginning of a period of use so that its plane makes the same angle with the "north" arrow 124 that the ship's axis makes with true north. Thereafter, the gyro compass 136 keeps wheel 125 directed in the same relation to table 123 that the direction of the ship's motion bears to the points of the compass.

Frame 131 is constrained by a parallel motion linkage 140 connected to a stanchion 141, which is secured to table 123, so that it may travel freely to any part of table 123. Frame 131 supports a frame 142 which is arranged for rotation about a vertical axis relative to frame 131.

A motor device 143 is supported by frame 142 and upon the shaft of this motor is secured a gear 144. A gear 145 is fixedly secured to the upper end of frame 131 and meshes with a pinion gear 146 carried at the lower end of a stub shaft 147 which is journaled in the frame 142. A pinion 148 at the upper end of shaft 147 meshes with gear 144.

The motor 143 is the repeater unit of another synchro direction transmitting system, the transmitter unit being indicated at 150 and connected to repeater 143 by cable 151. The position of the rotor element of transmitter 150 is determined by the position of transducer 152 and the two are connected by meshed gears 153, 154.

Supported by brackets 155 extending vertically from the frame of motor 143 is still another motor device 156, the rotor shaft of which rotates a worm 157. An arm 158 having a rack gear portion 160 engaged with worm 157 is slidably mounted in a pair of supports 161, 162 secured to the frame of motor 156. Motor 156 is also a repeater unit of a selsyn pair. It connects via cable 163 to its companion transmitter unit 164, the latter being geared through meshed gear 165 and gear wheel 166 to follow the change in target range as an operator turns gear wheel 166 to keep pointer member 167 aligned with the instant target range as recorded on chart 168 of recorder 170. This may also be done automatically through a suitable electro-mechanical servo coupling to eliminate the operator function as described in the aforesaid Rodman et al. application. Recorder 170 connects with the transmitter and receiver units 171, 172 of the echo ranging equipment via conductor pairs 173, 174.

A stylus 175 supported on the top of motor casing 156 and aligned with the vertical axis through wheel 125, synchro repeater units 132 and 143 and frames 131, 142 is adapted to trace out the course 176 of the vessel upon which the equipment is mounted on the underside of a translucent table 177 as wheel 125 moves over table 123. Table 177 may be supported by table 123 by any suitable bracket means, not shown.

Another stylus 178 located at the end of arm 158 also engages the underside of table 177 to trace out the course 181 of the target vessel.

In operation of the device shown in Fig. 1, stylus 175 in vertical registry with wheel 125, traces out the course 176 of the ship relative to the body of water in which it moves. Hence, the instant position of the vessel is represented by the instant position of stylus 175.

Stylus 178 at the end of arm 158 traces out the course 181 of the target. Hence, the position of stylus 178 represents the instant position of the target. That is, the true angular position taken by arm 158 is always the same as that of transducer 152 which is kept trained on the target once sound contact has been established through the echo ranging equipment, and the distance from stylus 175 to stylus 178 is proportional to the range of the target from the vessel.

Figs. 2, 3 and 4 show a modification of the invention as illustrated in Fig. 1, in which styli 175 and 178 are each replaced with a magnet 182 having sharp-edged annular coaxial poles (Fig. 3). Resting upon a translucent table 183, which takes the place of table 177 in Fig. 1 are two small carriages 184, 185 which represent the attacking vessel and target, respectively. Each of the carriages 184, 185 has two front ball bearing supports 186 and a single rear support wheel 187. Supports 186 yield readily in any direction, laterally or otherwise. Wheel 187 yields only in a longitudinal direction with respect to the carriages 184, 185. Each of the carriages has a magnet 188 which is similar to and placed opposite magnet 182. Magnets 182 and 188 may be "permanent" or electroenergized.

Accordingly, as the two magnets 182 move beneath table 183, representing motion of the attacking vessel and target, carriages 184 and 185 will execute like movements on the top of table 183 and an observer will therefore obtain a good visual indication of the motion of his vessel in relation to that of the target. Traces of the courses may be charted on table 183 by stylus 190 carried by each of the magnets 182 so that the trace continues to be made whether the carriages are in place or not.

If desired, carriage 184 may carry a longitudinally adjustable pointer 191 and carriage 185 a similar pointer 192. Assuming that the attacking vessel carries a projector on its bow directed ahead and adapted to lob an explosive charge at a predetermined distance, the tip of pointer 191 may be set at a distance from its support bracket 193 which is proportional to the distance the charge will travel forward of the projector plus the distance the attacking vessel will go meanwhile. Thus, the tip of pointer 191 indicates at any instant the place where the charge will sink if fired at that instant.

From timed marks which may be made on table 183 of the trace of the target, its speed may be determined. Also, an estimate is made, from what data are available, of the depth of the target. Knowing the speed of the target, the time of flight of the explosive charge and the time of its descent through the water to the level of the target, pointer 192 is adjusted so that the distance between the pointer tip and bracket 194 is proportional to the distance the target will go during the time of flight and descent of the explosive charge.

From a study of the course of the target, represented by carriage 185, the attacking vessel, represented by carriage 184, is set upon a course which will bring the tips of pointers 191 and 192 into contact with each other, at which time the explosive charge is projected forward off the bow of the attacking vessel. If all factors have been computed correctly, the explosive charge should sink near the target at which position it will be detonated and sink or at least damage the target.

In Fig. 2 the courses of the attacking vessel and target, respectively, to points A and B, their instant position on table 183, are indicated by solid traces 195, 196, respectively. Assuming their future courses to be as indicated by the broken traces 197 and 198, the correct time for projecting the explosive charge would be when the two carriages reach positions C and D, respectively, where the tips of pointers 191 and 192 will coincide.

In Fig. 5, there is shown an arrangement which may be used in lieu of the carriage 184 and pointer 191. Referring now to this figure and also to Fig. 1 for corresponding elements, yoke 126 carries a bracket 199 and a forwardly projecting lamp and lens system 200 which will put a spot of light 201 on the underside of table 183, which is translucent. Lamp 200 is pivoted at 202 on a transverse horizontal axis and its angle of elevation may be adjusted by means of a worm sector gear 203, worm 204 and knurled head 205 provided for rotating the latter. An index 206 may be provided and the sector gear 203 graduated in terms of ship's speed. Thus, instead of adjusting the length of pointer 191 as in Fig. 2, the corresponding adjustment in Fig. 5, is made by turning the head 205 to throw the light spot 201 ahead of the attacking vessel by the proper amount. Operation of the arrangement in Fig. 5 is then in relation to the light spot 201 instead of as described in relation to the tip of pointer 191. Using the light spot arrangement the carriage 185 representing the target may or may not be used. If not used, the speed and depth of the target may be estimated more or less systematically using apparatus which forms no part of the present invention.

In conclusion, while this invention has been described in connection with its application to plotting the course of an underwater target, it is to be understood that the invention is not so limited. The invention can be applied equally well to surface or other targets, in which case, other and more suitable types of target range and bearing apparatus such as radar, for example, would be substituted for the underwater echo ranging equipment illustrated and described.

As used herein the word "course" should be taken to mean not only the present heading of a vessel, but includes as well the connotation of past and present position.

It is to be understood that the invention is not to be limited to the specific structures described since it is evident that various changes and modifications may be made by those skilled in the art without departing from the spirit and scope of the invention as defined by the appended claims.

Having thus fully described my invention, I claim:

1. Position plotting apparatus of the character described for indicating the instantaneous positions, relative movements and courses of travel of two independently varying self-propelled vehicles moving in the plane of the earth's surface on a planar reference chart carried by a first of said vehicles, said apparatus including a plurality of synchro-repeater type drive means, a first of said drive means being responsive to input signal intelligence indicative of instantaneous changes in bearing of said first vehicle with respect to a fixed geographical reference whereby said plotting apparatus is continuously maintained in orientation with respect to said geographical reference, a second of said drive means being responsive to signal intelligence correlative to changes in linear speed of said first vehicle, a third of said drive means being responsive to the relative bearing of said second vehicle with respect to the instantaneous position of said first vehicle, and a fourth said drive means being continuously responsive to input signal intelligence correlative to the instantaneous relative range between said first and second vehicles, said apparatus further including a supporting table disposed in parallelism with said reference chart, a pantograph arm mechanism, stanchion means for mounting said pantograph arm mechanism in a plane intermediate said chart and supporting table, means for mounting said second mentioned drive means at the center of the outer portion of said pantograph arm mechanism, a first vertically disposed frame member affixed to the outer portion of said pantograph arm mechanism, a yoke member having a rotatable shaft journalled in the lower portion of said frame member and extending vertically upward therefrom and connected to be driven by said second drive means, a transverse shaft journalled in said yoke, a feed roller affixed to said transverse shaft, said first drive means being mounted on said yoke and connected to said transfer shaft in a manner to drive said feed roller along the surface of said supporting table, gear train means having a first element thereof affixed to the upper portion of said frame member, a second vertically disposed frame member rotatably mounted in axially aligned relation to the axis of rotation of the shaft of said yoke member, said second frame member being journalled at the center of said gear train means element for relative rotation with respect thereto, said gear train means being connected to the output of said third drive means and having elements thereof journalled in said second frame member and so connected to said first element thereof so as to provide rotative displacement of said first and second frame members, a third frame member extending upwardly in vertical alignment with the axes of said first and second frame members and carrying a first scribing means at the upper end thereof, means for mounting said fourth drive means on said third frame member, means extending laterally from said third frame member and carrying a longitudinally slidable gear rack, a second scribing means carried by said gear rack at the outer end thereof, and a second gear means connected to the output of said fourth drive means for providing linear movement of said rack with respect to said third frame member, said scribing means being disposed in a manner to scribe, on said chart, plots of the changes in the relative positions of said moving vehicles.

2. The structure of claim 1 further characterized by the inclusion of a planar plotting board, means for mounting said plotting board in spaced relation to said supporting table on which said feed roller is engaged, wherein each of said scribing means includes a magnetic element mounted in concentric relationship therewith, and disposed in close spaced adjacency to the underside of said plotting board, a pair of carriage means disposed to rest and move along the upper side of said plotting board, each of said plurality of scribing means respectively including a magnet means disposed to cooperate with and be motivated by the respective magnetic element carried in concentric relationship with each of said scribing means respectively, whereby one of said carriage means will trace out the course of the first of said moving vehicles which is carrying the instant plotting apparatus and the other of said carriage means will trace out the course of the second of said moving vehicles.

3. The combination of claim 2 wherein each of said carriages include antifriction roller members and adjustable pointer means.

References Cited in the file of this patent

UNITED STATES PATENTS

| | | |
|---|---|---|
| 1,293,747 | Ford | Feb. 11, 1919 |
| 1,310,201 | Maxim | July 15, 1919 |
| 1,891,502 | Sayre | Dec. 20, 1932 |
| 2,395,351 | Sohn | Feb. 19, 1946 |
| 2,413,300 | Dunn et al. | Dec. 31, 1946 |
| 2,437,243 | Curtis | Mar. 9, 1948 |

FOREIGN PATENTS

| | | |
|---|---|---|
| 21,427 | Great Britain | of 1911 |
| 337,455 | Germany | May 31, 1921 |